(12) United States Patent
Watson

(10) Patent No.: US 6,983,922 B2
(45) Date of Patent: Jan. 10, 2006

(54) PILOTED DIRECTIONAL CONTROL VALVE

(76) Inventor: Richard R. Watson, 2015 Glenn Lakes La., Missouri City, TX (US) 78459

( * ) Notice: Subject to any disclaimer, the term of this patent is extended or adjusted under 35 U.S.C. 154(b) by 39 days.

(21) Appl. No.: 10/822,576

(22) Filed: Apr. 12, 2004

(65) Prior Publication Data

US 2005/0224734 A1    Oct. 13, 2005

(51) Int. Cl.
    *F16K 31/12*      (2006.01)
(52) U.S. Cl. .................. 251/30.01; 251/161; 251/317; 137/625.46
(58) Field of Classification Search ............ 251/30.01, 251/314, 316, 317, 317.01, 161; 137/625.15, 137/625.21, 625.41, 625.46
See application file for complete search history.

(56) References Cited

U.S. PATENT DOCUMENTS

| | | | |
|---|---|---|---|
| 3,014,499 A | 12/1961 | Barksdale | |
| 3,556,151 A | 1/1971 | Masuda et al. | |
| 4,088,152 A | 5/1978 | Baugh | |
| 4,156,437 A | * | 5/1979 | Chivens et al. ............. 137/554 |
| 4,157,521 A | 6/1979 | Leland | |
| 4,310,022 A | 1/1982 | Cohen | |
| 4,848,404 A | 7/1989 | Hickok | |
| 4,856,557 A | 8/1989 | Watson | |
| 4,890,645 A | 1/1990 | Andersen | |
| 6,167,909 B1 | 1/2001 | Davis | |
| 6,276,396 B1 | 8/2001 | Kirkman | |

FOREIGN PATENT DOCUMENTS

| | | |
|---|---|---|
| GB | 1 438 275 | 6/1973 |
| GB | 2 064 727 A | 11/1980 |
| JP | 3041271 | 2/1991 |

* cited by examiner

*Primary Examiner*—David J. Walczak
*Assistant Examiner*—Peter deVore
(74) *Attorney, Agent, or Firm*—Browning Bushman P.C.

(57) ABSTRACT

An electrically powered rotary solenoid drives a hydraulic pilot valve to actuate a hydraulic main valve. The pilot valve includes a seal carrier rotatable with respect to a seal plate. A carrier supply port and a plate supply port are centered about an axis of rotation to remain in fluid communication during rotation. A carrier function port and plate function port are spaced from the axis of rotation, such that they may be selectively placed in fluid communication to pass fluid to actuate the main valve. When actuated, the main valve passes fluid pressure to one or more hydraulically actuated components.

19 Claims, 3 Drawing Sheets

PILOTED DIRECTIONAL CONTROL VALUE

FIELD OF THE INVENTION

This invention relates to a method and apparatus for controlling the distribution of high pressure hydraulic fluid with an electric signal. More specifically, the present invention relates to a combination of a pilot valve and a main valve where each has a sliding gate type sealing element for high reliability.

BACKGROUND OF THE INVENTION

The efficient production of oil and gas from subsea wells requires the remote control of valves, which pass hydraulic fluid to actuate various well functions such as connectors, latches, valve actuators, flow control devices, and the like. Solenoid energized valve mechanisms are typically used for this purpose. The solenoids are energized by electrical energy transmitted through long power cables that extend from a surface based power source to the location of the valves. Because subsea solenoid valves for well control are inaccessible from the standpoint of service, high reliability is crucial. An example of a solenoid actuated valve for handling high pressure fluids is disclosed in U.S. Pat. No. 4,088,152 to Baugh. The Baugh device uses a solenoid to directly drive a valve gate having sliding shear seals, and incorporates roller bearings to reduce frictional loading.

Maintaining high levels of hydraulic fluid cleanliness through control lines is a challenge, partly because control lines can be many miles long. Valves constructed with sliding shear seals are well suited for reliable operation when high pressure fluids are contaminated with particulate. Larger valve seating forces generally correlate with higher reliability, and small seats with low seating force are less resistant to fluid borne contamination. A valve having shear seals is therefore often used for the main valve. A major disadvantage of shear type valve mechanisms is the large frictional force to which the valve mechanism is ordinarily subjected. Larger frictional forces cause larger power consumption of the valve actuator. Unfortunately, long control lines for carrying signals and electric power to valves limit the amount of current available to each valve. It is inefficient to directly drive a sliding type main valve with a solenoid.

A common approach that minimizes electrical power requirements is to use a small poppet-type solenoid valve to pilot the larger main valve. U.S. Pat. No. 4,848,404 to Hickok discloses an example of a piloted main valve, wherein the pilot valve is a low pressure poppet-type solenoid valve. Poppet type solenoid valves require very little electric power due to the small valve seat and the low force needed to move the valve element. A major disadvantage of poppet valves, however, is their decreased resistance to contamination. A typical solution to this problem is to provide a separate, low-pressure, and well-filtered fluid supply for the pilot valve. The reduced pressure keeps operating force low and reduces damage to the small seat while better filtration prevents failures caused by fluid contamination. This level of filtration is not typically required for slide valves. The shearing action of the hard metal seal edges of slide valves excludes fluid born contamination and accomplishes efficient sealing under circumstances that would interfere with the sealing capabilities of poppet valves.

Principally, the key to reducing the frictional forces of a sliding seal valve is to reduce the area of the sliding seal that is exposed to pressure. U.S. Pat. No. 4,856,557 discloses a valve having smaller sliding seals in order to reduce actuation force, but two seals are required to slide on their respective seal plates, which multiplies the actuation force. A point of diminishing practicality is soon reached with the traditional methods of reducing the pressure responsive area of valves of this type. A narrower contact surface seal reduces the pressure responsive area, but at the risk of reduced structural integrity and reduced seal path dimension. A smaller diameter seal reduces the pressure responsive area but encounters difficulties because of the very small manufacturing and alignment tolerances that are presented and the reduced flow path dimension.

Another category of shear seal valve involves rotary seal elements. Rotary shear seal type valves have long been used, such as disclosed in U.S. Pat. No. 3,556,151 to Masuda and U.S. Pat. No. 3,014,499 to Barksdale. These also require torsional actuation force to slide at least two seals in an arc on the seal plate.

An improved valve mechanism having the reliability of shear seals without their typically high power consumption would be desirable.

SUMMARY OF THE INVENTION

According to one embodiment of the invention, a pilot valve is disclosed for operating a hydraulically-actuated main valve, the main valve selectively passing fluid from a main valve supply port to a main valve function port to supply fluid pressure to operate one or more component functions. The pilot valve includes a seal carrier rotatable with respect to a seal plate. The seal carrier defines a carrier surface, a carrier supply port passing through the carrier surface, and a carrier function port in communication with the carrier supply port and passing through the carrier surface. The seal plate defines a planar sealing surface spaced from and facing the carrier surface to define a spacing, a plate supply port passing through the planar sealing surface, and a plate function port passing through the planar sealing surface and passing pressurized fluid to actuate the main valve. A supply seal seals between the carrier supply port and the plate supply port. A function seal seals with the carrier function port and slidably seals with the planar sealing surface. The seal carrier is rotatable relative to the seal plate about an axis of rotation between an active position and an inactive position, the carrier supply port and the plate supply port being substantially centered about the axis of rotation to remain in sealed fluid communication during said rotation. The carrier function port and plate function port are radially spaced from the axis of rotation and positioned such that in the active position the carrier function port is generally aligned and sealed with the plate function port to pass fluid to actuate the main valve, and in the inactive position the carrier function port is spaced from the plate function port and is closed off by the sealing surface. An electrically powered prime mover rotates the seal carrier between the active and inactive positions.

According to another embodiment of the invention, a valve assembly comprises a main valve body, a movable main valve element engageable with a main valve seat, and a reciprocating, hydraulically-actuated main valve actuator for moving the main valve element to selectively pass fluid through the main valve body between a main valve supply port and a main valve function port, the main valve function port passing fluid pressure to operate one or more component functions. A seal carrier defines a carrier surface, a carrier supply port passing through the carrier surface, and a carrier function port in communication with the carrier supply port and passing through the carrier surface. A seal plate defines a planar sealing surface spaced from and facing the carrier surface to define a spacing, a plate supply port passing through the planar sealing surface, and a plate function port passing through the planar sealing surface and for selectively passing pressurized fluid to actuate the main valve actuator. A supply seal seals between the carrier supply port and the plate supply port. A function seal seals with the carrier function port and slidably seals with the planar sealing surface. The seal carrier is rotatable relative to the seal plate about an axis of rotation between an active position and an inactive position, the carrier supply port and the plate supply port being substantially centered about the axis of rotation to remain in sealed fluid communication during said rotation. The carrier function port and plate function port are radially spaced from the axis of rotation and positioned such that in the active position the carrier function port is generally aligned and sealed with the plate function port to pass fluid to actuate the main valve actuator, and in the inactive position the carrier function port is spaced from the plate function port and is closed off by the sealing surface. An electrically powered prime mover rotates the seal carrier between the active and inactive positions.

The foregoing is intended to give a general idea of some embodiments of the invention, and is not intended to fully define nor limit the invention. The invention will be more fully understood and better appreciated by reference to the following description and drawings.

DETAILED DESCRIPTION OF SPECIFIC EMBODIMENTS

Figure 1:
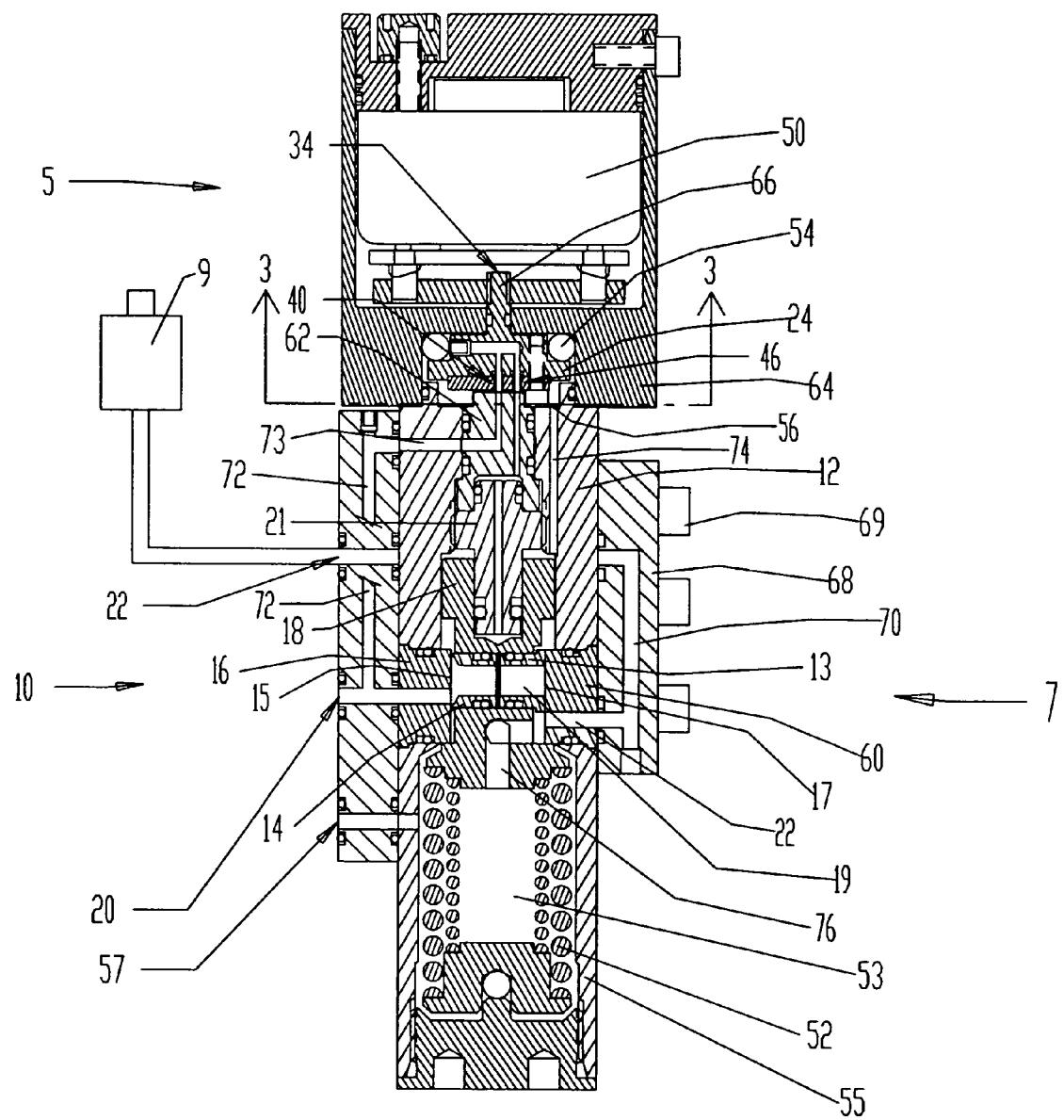
FIG. 1 shows a preferred embodiment of a piloted directional control valve, including a pilot valve assembled with the main valve.

FIG. 1 shows a preferred embodiment of a valve assembly indicated generally at 10 for operating one or more hydraulic components symbolically indicated at 9 in a subsea well environment. The valve assembly 10 comprises a pilot valve generally indicated at 5 and a main valve generally indicated at 7. The overriding purpose of the pilot valve 5 is to pass hydraulic fluid to actuate the main valve 7, which in turn passes fluid pressure to operate the components 9. The components 9 may include, for example, connectors, latches, additional valve actuators, flow control devices, and other components which can be actuated hydraulically. Multiple valve assemblies can be efficiently positioned subsea, such as side by side on a manifold, for individual operation of various components.

The main valve 7 shown is a gate-type shear seal embodiment. A main valve body 12 houses a movable main valve element that includes two pieces: an upstream valve element 14 and a downstream valve element 13. An upstream seat body 16 has an upstream seat 15 for sealing with the upstream valve element 14, and a downstream seat body 60 has a downstream seat member 17 for sealing with the downstream valve element 13. The main valve 7 further includes a reciprocating, hydraulically-actuated main valve actuator 18 for moving the upstream and downstream valve elements 14, 13 to selectively pass fluid through the main valve body 12 from a main valve supply port 20, through an aperture 19 that extends through valve elements 14,13, and to a main valve function port 22. The main valve function port 22 in turn passes fluid pressure to operate the one or more component functions 9. A flange 68 may provide multiple mounting locations 69, such as for mounting to a manifold, and may define a portion 70 of the main valve function port 22.

The main valve 7 is shown in a closed position in FIG. 1. The aperture 19 is positioned in fluid communication with the valve supply port 20, such that the main valve element 14 is open to the main valve supply port 20. The aperture 19 is spaced from the main valve function port 22, and the main valve element 13 is therefore closed to the downstream main valve function port 22. Thus, fluid pressure cannot pass to the main valve function port 22 to activate downstream components 9.

As shown, the moveable main valve actuator 18 may include a "cylinder" 18 movable with respect to a stationary "piston" 21 in response to the introduction of hydraulic fluid pressure between the cylinder 18 and piston 21. As the main valve actuator 18 moves the upstream and downstream valve elements 14, 13 toward an open position, they remain in sealing contact with the upstream and downstream seat members 15, 17. When in the open position, the aperture 19 has moved downward so that it is in fluid communication with both the main valve supply port 20 and the main valve function port 22. Thus, in the open position, fluid pressure may be passed through the main valve 7 from the main valve supply port 20 to the main valve function port 22, to activate the components 9.

Figure 2:
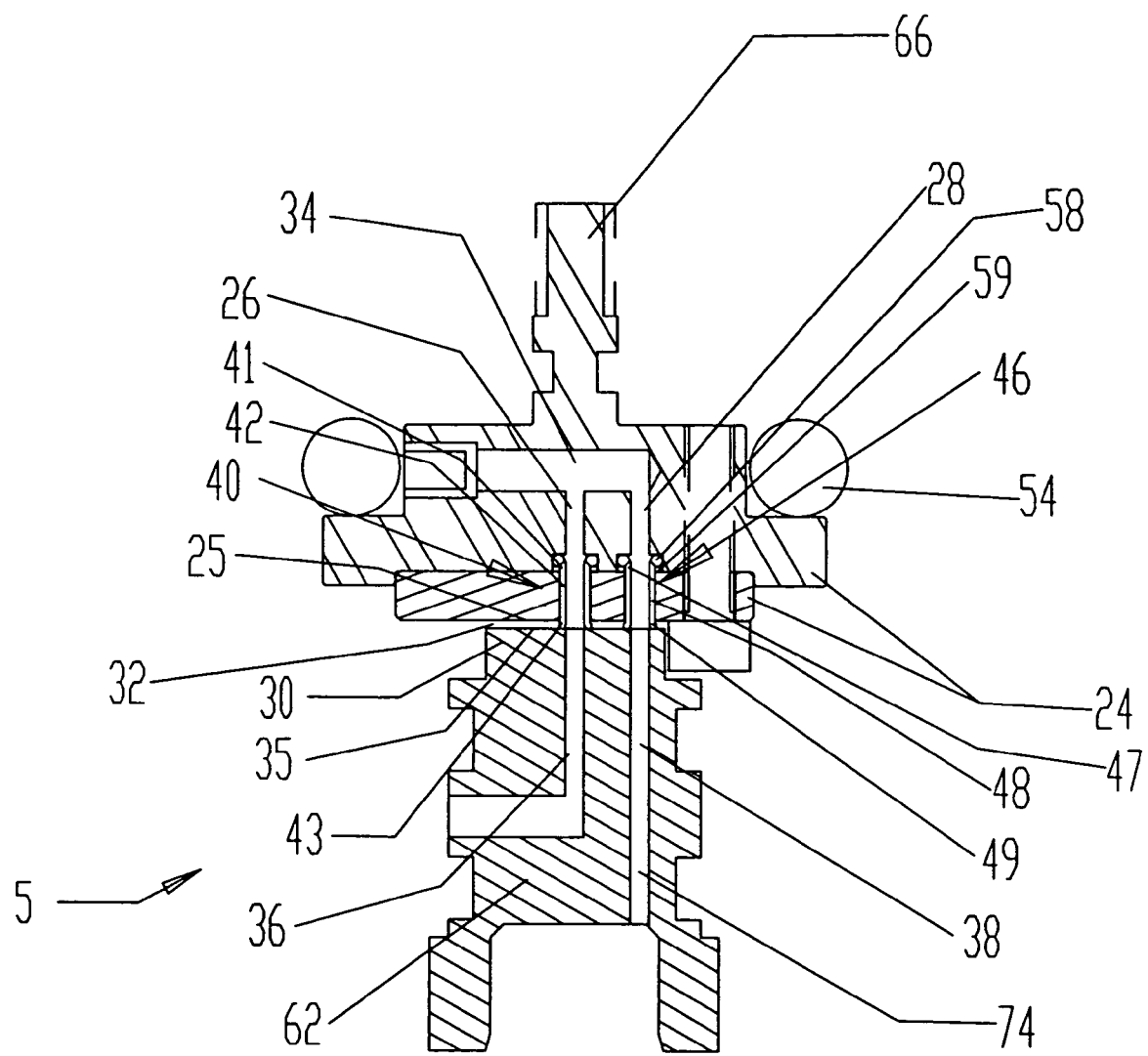
FIG. 2 shows a closer view of the pilot valve.

The purpose of the pilot valve 5 is to control or "pilot" the main valve 7. As detailed more closely in FIG. 2 and even more closely in FIG. 5, the pilot valve 5 includes a seal carrier 24 defining a carrier surface 25, a carrier supply port 26 passing through the carrier surface 25, and a carrier function port 28 in communication with the carrier supply port 26 and passing through the carrier surface 25. A seal plate 30 defines a planar sealing surface 35 spaced from and facing the carrier surface 25 to define a gap or spacing 32. It may be observed that the seal plate 30 may refer generally to a body 62 or simply the upper portion of body 62 having other functionality not limited to the seal plate 30, and whose overall shape need not resemble a "plate" in the conventional sense. A plate supply port 36 and a plate function port 38 pass through the planar sealing surface 35. The plate function port 38 is for selectively passing pressurized fluid to actuate the main valve actuator 18 as described above. A supply seal 40 seals between the carrier supply port 26 and the plate supply port 36. Preferably, the supply seal 40 includes a supply seal sleeve 42 having a carrier end 41 sealed with the carrier supply port 26 and a plate end 43 extending to and in slidable metal-to-metal sealing engagement with the planar sealing surface 35. A function seal 46 is also included, sealing with the carrier function port 28 and slidably sealing with the planar sealing surface 35. Preferably, the function seal 46 includes a function seal sleeve 48 having a carrier end 47 sealed with the carrier function port 28 and a plate end 49 extending to and in slidable metal-to-metal sealing engagement with the planar sealing surface 35 of the seal plate 30.

To seal the carrier end 47 of the function seal sleeve 48 in a preferred embodiment, an elastomer seal 58 is disposed adjacent the carrier end 47 of the function seal sleeve 48. The elastomer seal 58 not only seals between the function seal sleeve 48 and the carrier function port 28, it urges the function seal sleeve 48 slightly toward the seal plate 30. A plastic backup ring 59 helps prevent extrusion of the softer elastomer seal 58. Because the elastomer seal 58 is relatively soft, it may not urge the function seal sleeve 48 with sufficient force to generate a reliable metal-to-metal seal between the plate end 43 and the planar sealing surface 35. However, the function seal 46 is energized by fluid pressure within the carrier function port 28 for reliable metal-to-metal sealing.

Figure 3:
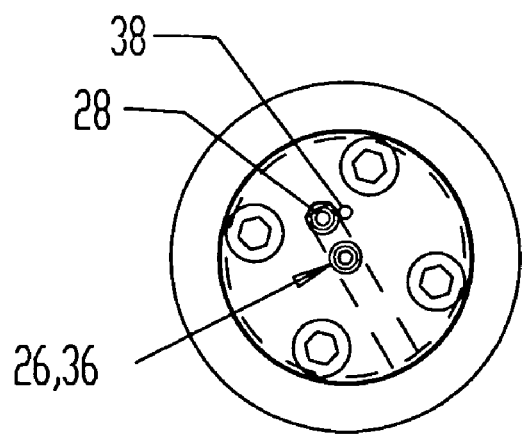
FIG. 3 shows a sectional view of the seal carrier and seal plate taken along line 3—3 of FIG. 1, with the plate function port generally aligned with the carrier function port.
Figure 4:
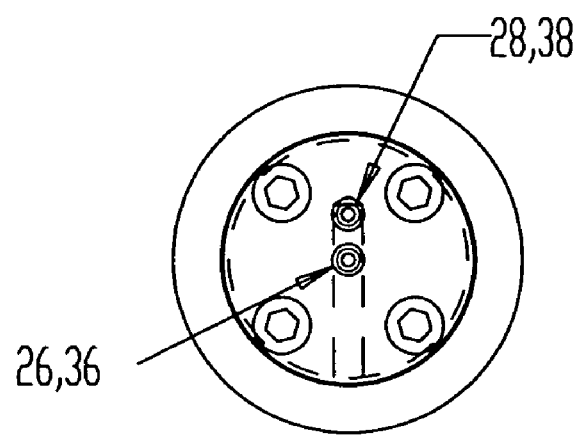
FIG. 4 shows a sectional view of the seal carrier and seal plate taken along line 3—3 of FIG. 1, with the seal plate rotated to space the plate function port from the carrier function port.

The seal carrier 24 is rotatable relative to the seal plate 30 about an axis of rotation 34 between an active position shown in FIG. 4 and an inactive position shown in FIGS. 1 and 3. An electrically powered prime mover 50 provides this rotation, and is preferably an electrical rotary solenoid 50 which engages the seal carrier 24 via stem 66. Rotary solenoid 50 includes a rotary solenoid housing 64 and a biasing member (not shown) for biasing toward the inactive position. A plurality of ball bearings 54 axially support the seal plate 30 to reduce rotational friction. The ball bearings 54 are supported between the seal plate 30 and the solenoid housing 64. The carrier supply port 26 and the plate supply port 36 are substantially centered about the axis of rotation 34, so that they remain in sealed fluid communication during said rotation. The carrier function port 28 and plate function port 38 are radially spaced from the axis of rotation 34 and positioned as shown, such that in the active position (FIG. 4) the carrier function port 28 is generally aligned and sealed with the plate function port 38 to pass fluid to actuate the main valve actuator 18 along passage 74. In the inactive position (FIG. 3), due to the rotation of the seal carrier 24, the carrier function port 28 is spaced from the plate function port 38 and is thereby closed off by the sealing surface 35. With the carrier function port 28 closed off in this manner, the main valve actuator 18 is not being actuated, and is preferably biased to the closed position (FIG. 1 and 3) by biasing member or spring 52. Because the main valve actuator 18 is closed, fluid is not being passed through the main function port 22 to operate the hydraulic component(s) 9—hence, the term "inactive position." At this point it maybe observed that the term "function" as it applies to the carrier function port 28 and the plate function port 38 refers to the function of actuating the actuator 18 of the main valve 7, whereas the term as it applies to the main valve function port 22 refers to operation of the component(s) 9.

As shown, the supply seal 40 may include an elastomer seal and backup ring similar to the seal 58 and ring 59 of the function seal sleeve 48. Because the supply seal 40 is centrally located with respect to the axis of rotation 34 and does not translate appreciably with respect to the planar sealing surface 35, it need not incorporate the same type of sliding seal included with the function seal 48. In alternative embodiments (not shown), for example, the supply seal may comprise a sleeve extending between and sealed with each of the carrier supply port 26 and the plate supply port 36 using o-ring type seals. In another embodiment, the supply seal may comprise a sleeve that is integral with one of the carrier supply port 26 and plate supply port 36, and extends to and seals with the other of the two ports 26, 36.

A number of advantages may be obtained by virtue of the valve assembly 10. First, the valve assembly 10 is more efficient than other piloted valve assemblies. Because the carrier supply port 26 and plate supply port 36 are substantially aligned about axis 34, there is minimal sliding friction between the supply seal 40 and the planar sealing surface 35. Instead, there is essentially pure rotation and no translation of the supply seal 40 relative to the planar sealing surface 35. Only the function seal 46 translates. Even then, the supply seal 40 and function seal 46 can be made relatively small because the carrier and plate supply ports 26, 36 and function ports 28, 38 are only required to pass a small amount of fluid as compared with the flow through the main valve 7 between the main valve supply port 20 and main valve function port 22. In one experiment, the torsional force required to move the supply seal 40 located on the central axis 34 is reduced by 80% compared to that required for the function seal 46.

As a further advantage, by reducing the pilot valve actuating force, the electric power requirement is reduced so that a shear seal type valve construction may be used for both the pilot and main valve. Thus, both the pilot valve and the main valve benefit from this reliable type of seal.

A related advantage of incorporating shear seals into both the pilot valve 5 and main valve 7 is that a common fluid source may be used for the pilot valve 5 and main valve 7, rather than having to employ a costly separate, filtered source for the pilot valve 5. To construct this common fluid source, the main valve supply port 20 can be placed in fluid communication with the plate supply port 36, such that the common fluid source supplies both fluid actuating the main valve actuator 18 and fluid passing through the main valve body 12 between the main valve supply and function ports 20, 22. Fluid communication between ports 20 and 36 is provided along passages 72 and 73 within the main valve housing.

To further optimize the construction of the valve assembly 10, vent ports may be placed in communication with one another. A plate vent port 56 is placed in communication with the spacing 32 between the planar sealing surface 35 and the carrier surface 25, such that in the inactive position, the plate function port 38 vents to the plate vent port 56. This allows the actuator 18 to return to its biased-closed position. An actuator housing 55 defines an actuator cavity 53 for housing the actuator biasing member 52. The actuator cavity 53 has a variable volume due to movement of the actuator 18, and therefore includes an actuator vent port 57 for venting the actuator cavity 53. The actuator cavity 53 may be placed in communication with the spacing 32, so that the plate vent port 56 is in communication with the actuator vent port 57. This fluid communication is provided from actuator vent port 57, through actuator cavity 53, up through passage 76, through a non-sealed pathway around the valve elements 14, 13 and actuator 18 within the main valve body 12, and to plate vent port 56, which is in communication with spacing 32.

Having outlined the various details of the preferred embodiment above, a preferred sequence of operation of the valve may be described. Beginning with the inactive position of FIG. 1, the rotary solenoid 50 is biased by its biasing member toward the inactive position, wherein the carrier function port 28 is spaced from the plate function port 38. Fluid pressure is thus supplied from a fluid source to the plate supply port 36, the carrier supply port 26, and the carrier function port 28, but the carrier function port 28 is sealed against the planar sealing surface 35 so fluid is not permitted to pass any further. Simultaneously, the plate function port 36 is open to the spacing 32 and is vented to actuator vent port 57 through the path described above. The actuator 18 is therefore also vented, and the spring 52 biases the actuator to the closed position of FIG. 1. In this inactive position, fluid passes to the main valve 7 via main valve supply port 20 and into aperture 19 of the sealing element 14, but is sealed off against downstream seat member 17.

To activate the one or more components 9, an operator, computer, or the like sends a signal to activate the rotary solenoid 50. Coils in the rotary solenoid 50 energize, causing a rotational torque on stem 66 that rotates seal carrier 24 to the active position of FIG. 4. The carrier function port 26 is now in sealed fluid communication with plate function port 36, and fluid pressure supplied from the fluid source passes to the plate supply port 36, the carrier supply port 26, and the carrier function port 28, and continues to the plate function port 38, along passage 74, and to the actuator 18. The actuator is energized by the fluid pressure, and moves downward, to move the upstream and downstream valve elements 14, 13 along the upstream and downstream valve seats 15, 17, placing aperture 19 in sealed fluid communication with both the main valve supply port 20 and main valve function port 22. Fluid from the main valve supply port 20 passes through the main valve 7 and to the one or more components 9, which are hydraulically actuated by the fluid pressure. When desired, the signal to the rotary solenoid 50 may be cancelled, which essentially reverses the above described sequence, returning the solenoid 50 the inactive position, closing the main valve 7, and returning the components 9 to their inactive state.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations, and modifications, including but not limited to those design alternatives specifically discussed herein, may be made in the practice of the invention without departing from its scope.

What is claimed is:

1. A pilot valve for operating a hydraulically-actuated main valve, the main valve selectively passing fluid from a main valve supply port to a main valve function port to supply fluid pressure to operate one or more component functions, the pilot valve comprising:
   a seal carrier defining a carrier surface, a carrier supply port passing through the carrier surface, and a carrier function port in communication with the carrier supply port and passing through the carrier surface;
   a seal plate defining a planar sealing surface spaced from and facing the carrier surface to define a spacing, a plate supply port passing through the planar sealing surface, and a plate function port passing through the planar sealing surface and passing pressurized fluid to actuate the main valve;
   a supply seal sealing between the carrier supply port and the plate supply port;
   a function seal sealing with the carrier function port and slidably sealing with the planar sealing surface by a metal-to-metal seal during rotation of the seal carrier relative to the seal plate;
   the seal carrier rotatable relative to the seal plate about an axis of rotation between an active position and an inactive position, the carrier supply port and the plate supply port being substantially centered about the axis of rotation to remain in sealed fluid communication during said rotation, the carrier function port and plate function port being radially spaced from the axis of rotation and positioned such that in the active position the carrier function port is generally aligned and sealed with the plate function port to pass fluid to actuate the main valve, and in the inactive position the carrier function port is spaced from the plate function port and is closed off by the sealing surface; and
   an electrically powered prime mover for rotating the seal carrier between the active and inactive positions.

2. A pilot valve as defined in claim 1, wherein the function seal further comprises:
   a function seal sleeve having a carrier end sealed with the carrier function port and a plate end extending to and in slidable sealing engagement with the planar sealing surface of the seal plate.

3. A pilot valve defined in claim 2, wherein the function seal further comprises:
   an elastomer seal adjacent the carrier end of the function seal sleeve, the elastomer seal sealing between the function seal sleeve and the carrier function port and urging the function seal sleeve toward the seal plate.

4. A pilot valve as defined in claim 1, further comprising:
   a plurality of ball bearings axially supporting the seal plate to reduce rotational friction.

5. A pilot valve as defined in claim 1, further comprising:
   a plate vent port in communication with the spacing between the planar sealing surface and the carrier surface, such that in the inactive position, the plate function port vents to the plate vent port.

6. A pilot valve as defined in claim 1, wherein the main valve supply port is in fluid communication with the plate supply port, such that the pilot valve and the main valve share a common fluid source.

7. A pilot valve as defined in claim 1, wherein the supply seal further comprises:
   a supply seal sleeve having a carrier end sealed with the carrier supply port and a plate end extending to and in slidable sealing engagement with the planar sealing surface of the seal plate.

8. A pilot valve as defined in claim 7, wherein the supply seal further comprises:
   an elastomer seal surrounding the carrier end of the supply seal sleeve, the elastomer seal sealing between the supply seal sleeve and the carrier supply port and urging the supply seal sleeve toward the seal plate.

9. A pilot valve as defined in claim 1, wherein the prime mover comprises:
   a rotary solenoid.

10. A pilot valve for operating a hydraulically-actuated main valve, the main valve selectively passing fluid from a main valve supply port to a main valve function port to supply fluid pressure to operate one or more component functions, the pilot valve comprising:
    a seal carrier defining a carrier surface, a carrier supply port passing through the carrier surface, and a carrier function port in communication with the carrier supply port and passing through the carrier surface;
    a seal plate defining a planar sealing surface spaced from and facing the carrier surface to define a spacing, a plate supply port passing through the planar sealing surface, and a plate function port passing through the planar sealing surface and passing pressurized fluid to actuate the main valve;
    a supply seal sealing between the carrier supply port and the plate supply port; a function seal including a function seal sleeve having a carrier end and a plate end, an elastomeric seal adjacent the carrier end of the function seal sleeve to seal between the function seal sleeve and the carrier function port and urge the function seal sleeve toward the seal plate, the plate end extending to and in slidable metal-to-metal sealing engagement with the planar sealing surface of the seal plate;

the seal carrier rotatable relative to the seal plate about an axis of rotation between an active position and an inactive position, the carrier supply port and the plate supply port being substantially centered about the axis of rotation to remain in sealed fluid communication during said rotation, the carrier function port and plate function port being radially spaced from the axis of rotation and positioned such that in the active position the carrier function port is generally aligned and sealed with the plate function port to pass fluid to actuate the main valve, and in the inactive position the carrier function port is spaced from the plate function port and is closed off by the sealing surface; and an electrically powered prime mover for rotating the seal carrier between the active and inactive positions.

11. A pilot valve as defined in claim 10, further comprising:

a plate vent port in communication with the spacing between the planar sealing surface and the carrier surface, such that in the inactive position, the plate function port vents to the plate vent port.

12. A pilot valve as defined in claim 10, wherein the supply seal further comprises:

a supply seal sleeve having a carrier end sealed with the carrier supply port and a plate end extending to and in slidable sealing engagement with the planar sealing surface of the seal plate.

13. A valve assembly comprising:

a main valve body;

a movable main valve element engageable with a main valve seat;

a reciprocating, hydraulically-actuated main valve actuator for moving the main valve element to selectively pass fluid through the main valve body between a main valve supply port and a main valve function port, the main valve function port passing fluid pressure to operate one or more component functions;

a seal carrier defining a carrier surface, a carrier supply port passing through the carrier surface, and a carrier function port in communication with the carrier supply port and passing through the carrier surface;

a seal plate defining a planar sealing surface spaced from and facing the carrier surface to define a spacing, a plate supply port passing through the planar sealing surface, and a plate function port passing through the planar sealing surface and for selectively passing pressurized fluid to actuate the main valve actuator;

a supply seal sealing between the carrier supply port and the plate supply port; a function seal sealing with the carrier function port and slidably sealing with the planar sealing surface;

the seal carrier rotatable relative to the seal plate about an axis of rotation between an active position and an inactive position, the carrier supply port and the plate supply port being substantially centered about the axis of rotation to remain in sealed fluid communication during said rotation, the carrier function port and plate function port being radially spaced from the axis of rotation and positioned such that in the active position the carrier function port is generally aligned and sealed with the plate function port to pass fluid to actuate the main valve actuator, and in the inactive position the carrier function port is spaced from the plate function port and is closed off by the sealing surface; and an electrically powered prime mover for rotating the seal carrier between the active and inactive positions.

14. A valve assembly as defined in claim 13, further comprising:

the main valve supply port being in fluid communication with the plate supply port, such that a common fluid source supplies fluid actuating the main valve and fluid passing through the main valve body.

15. A pilot valve as defined in claim 13, further comprising:

a plurality of ball bearings axially supporting the seal plate to reduce rotational friction.

16. A pilot valve as defined in claim 13, further comprising:

a plate vent port in communication with the spacing between the planar sealing surface and the carrier surface, such that in the inactive position, the plate function port vents to the plate vent port.

17. A pilot valve as defined in claim 13, wherein the function seal further comprises:

a function seal sleeve having a carrier end sealed with the carrier function port and a plate end extending to and in slidable metal-to-metal sealing engagement with the planar sealing surface of the seal plate.

18. A pilot valve as defined in claim 13, further comprising:

an actuator biasing member for biasing the main valve actuator to close off flow between the main valve supply port and the main valve function port.

19. A pilot valve as defined in claim 18, further comprising:

an actuator cavity for housing the actuator biasing member, the actuator cavity including an actuator vent port in communication with the spacing between the seal carrier and the seal plate.

* * * * *